United States Patent Office 3,480,671
Patented Nov. 25, 1969

3,480,671
α-NAPHTHOXY ACETAMIDE COMPOSITIONS
Harry Tilles, El Cerrito, and Don R. Baker, Pinole, Calif., and Chester L. Dewald, Houston, Tex., assignors to Stauffer Chemical Company, New York, N.Y., a corporation of Delaware
No Drawing. Continuation of application Ser. No. 637,624, May 11, 1967. This application Jan. 16, 1969, Ser. No. 796,278
Int. Cl. C07c 103/22, 103/30; A01n 9/20
U.S. Cl. 260—559                        11 Claims

ABSTRACT OF THE DISCLOSURE

Substituted α-naphthoxy acetamides having the general formula

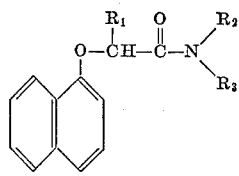

wherein $R_1$ is selected from the group consisting of hydrogen and lower alkyl, $R_2$ is selected from the group consisting of hydrogen, lower alkyl and lower alkenyl, and $R_3$ is selected from the group consisting of lower alkyl and lower alkenyl; provided that when $R_1$ and $R_2$ are both hydrogen, $R_3$ is lower alkyl having from 1 to 2 carbon atoms, inclusive, or lower alkenyl. The compounds are effective as herbicides in the control of grasses and broadleaf plants with both pre-emergence and post-emergence activity. Representative compounds are N,N-dimethyl α-naphthoxyacetamide, N,N-diethyl 2(α-naphthoxy)-propionamide, N-isopropyl 2(α-naphthoxy)-butyramide, N,N-dialkyl 2(α-naphthoxy)-propionamide and N-methyl α-naphthoxy-acetamide.

This application is a continuation of application Ser. No. 637,624, filed May 11, 1967, now abandoned, which is a continuation-in-part of application Ser. No. 352,310, filed Mar. 16, 1964, now abandoned.

This invention relates to certain new organic compounds which may be used as herbicides. More specifically, this invention relates to certain substituted α-naphthoxy acetamides and to the use of such compounds in herbicidal compositions.

The invention relates to compounds of the general formula:

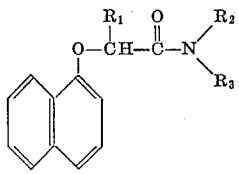

wherein $R_1$ is selected from the group consisting of hydrogen and lower alkyl, $R_2$ is selected from the group consisting of hydrogen, lower alkyl and lower alkenyl, and $R_3$ is selected from the group consisting of lower alkyl and lower alkenyl; provided that when $R_1$ and $R_2$ are both hydrogen $R_3$ is lower alkyl having from 1 to 2 carbon atoms, inclusive, or lower alkenyl. By the term lower alkyl unless otherwise limited we mean saturated hydrocarbon radicals having from 1 to 4 carbon atoms such as methyl, ethyl, n-propyl, iso-propyl, n-butyl, iso-butyl, sec.-butyl. By the term lower alkenyl we mean unsaturated hydrocarbon radicals having at least 1 double bond unsaturation and having between 2 and 4 carbon atoms, inclusive, such as ethylenyl, propenyl (allyl) and butenyl.

It has been found that the compounds of the present invention are particularly effective as herbicides. They are effective in the control of grasses and broadleaf plants with both pre-emergence and post-emergence activity.

The compounds of the present invention may be made in accordance with the following examples.

EXAMPLE 1

N,N-dimethyl α-naphthoxy acetamide

Sodium hydride (1.47 g., 0.0615 mole) was placed in a 500 cc. three-neck flask flushed out with argon and then covered with toluene (100 ml.). The α-naphthol (0.58 g., 0.0658 mole) was then added to the mixture. The reaction mixture was refluxed for a few minutes. N,N-dimethyl chloroacetamide (8.0 g., 0.0658 mole) was then dissolved in toluene (20 ml.) and added to the refluxing mixture in 17 minutes. It was only slightly exothermic at the beginning of the addition. The mixture was refluxed for an additional 4 hours, cooled and water (50 ml.) was added. The organic layer was washed with 2% sodium hydroxide solution (3× 50 ml.), water (2× 50 ml.), dried over magnesium sulfate and evaporated on the steam bath to yield 13 g. of a viscous dark amber liquid, $n_D^{28}$ 1.6084. On standing, it crystallized, M.P. 66–72° C.

EXAMPLE 2

N,N-diethyl 2(α-naphthoxy)-propionamide

α-Naphthol (144 g., 1.00 mole), N,N-diethyl α-bromopropionamide (208 g., 1.00 mole), and a 25% methanol solution of sodium methoxide (216 g., 1.00 mole) were mixed together and heated to reflux with stirring for 2½ hours. The reaction mixture was cooled to room temperature and diluted with water (1000 ml.). The product was extracted with chloroform (2× 200 ml.) and the chloroform extract was dried over magnesium sulfate and evaporated in vacuo to yield 212 g. of a dark oil. On standing, crystals started to form and the remainder was crystallized from n-pentane and washed with n-pentane to yield 190 g. of light brown solid, M.P. 63–64° C.

EXAMPLE 3

N-n-propyl α-naphthoxyacetamide

Ethyl α-naphthoxyacetate (6.1 g., 0.029 mole) and n-propylamine (10 ml.) and ethanol (50 ml.) were mixed together and heated to reflux for 3½ hours. The volatile materials were evaporated off in vacuo to yield an oil that started to crystallize. This was recrystallized from n-pentane to yield 6.8 g. of a white solid, M.P. 63.5–65° C.

EXAMPLE 4

N-isopropyl 2(α-naphthoxy)-butyramide

α-Naphthol (7.2 g., 0.05 mole), dimethylformamide (100 ml.), sodium hydride (2.4 g., 0.10 mole), and N-isopropyl 2-bromobutyramide (10.3 g., 0.05 mole) were mixed together in the order listed. External cooling was used during the mixing of the reactants. The stirred mixture was heated to 75 to 80° C. for one hour. It was cooled to room temperature and water (200 ml.) was added. A solid formed and was filtered off, washed with water, dilute sulfuric acid and again with water. The solid was dried in vacuo and yielded 11 g. of a white solid, M.P. 117.5–119° C.

The following is a table of the compounds prepared according to the aforedescribed procedures. Compound numbers have been assigned to each compound and are used throughout the balance of the application.

TABLE I

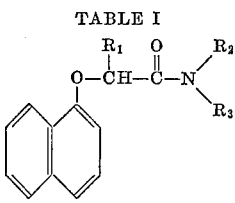

| Compound No. | $R_1$ | $R_2$ | $R_3$ |
|---|---|---|---|
| 1[1] | H | $CH_3$ | $CH_3$ |
| 2 | H | $C_2H_5$ | $C_2H_5$ |
| 3 | H | n-$C_3H_7$ | n-$C_3H_7$ |
| 4[2] | $CH_3$ | $C_2H_5$ | $C_2H_5$ |
| 5 | $CH_3$ | $CH_3$ | $CH_3$ |
| 6 | $CH_3$ | iso-$C_3H_7$ | iso-$C_3H_6$ |
| 7 | $CH_3$ | $CH_2CH=CH_2$ | $CH_2CH=CH_2$ |
| 8[3] | H | H | n-$C_3H_7$ |
| 9[4] | $C_2H_5$ | H | iso-$C_3H_7$ |
| 10 | $CH_3$ | n-$C_3H_7$ | n-$C_3H_7$ |
| 11 | H | $CH_2CH=CH_2$ | $CH_2CH=CH_2$ |
| 12 | H | iso-$C_3H_7$ | iso-$C_3H_7$ |
| 13 | H | n-$C_4H_9$ | n-$C_4H_9$ |
| 14 | H | iso-$C_4H_9$ | iso-$C_4H_9$ |
| 15 | $C_2H_5$ | n-$C_3H_7$ | n-$C_3H_7$ |
| 16 | $C_2H_5$ | $CH_2CH=CH_2$ | $CH_2CH=CH_2$ |
| 17 | H | H | $C_2H_5$ |
| 18 | H | H | $CH_3$ |
| 19 | $C_2H_5$ | H | n-$C_3H_7$ |
| 20 | $CH_3$ | H | n-$C_4H_9$ |
| 21 | $C_2H_5$ | H | n-$C_4H_9$ |
| 22 | $C_2H_5$ | H | i-$C_4H_9$ |

[1] No. 1 prepared in Example 1.
[2] No. 4 prepared in Example 2.
[3] No. 8 prepared in Example 3.
[4] No. 9 prepared in Example 4.

As previously mentioned, the herein described novel compositions produced in the above described manner are phytotoxic compounds which are useful and valuable in controlling various plant species. The compounds of this invention were tested as herbicides in the following manner.

Pre-emergence herbicide test

The seeds of crab grass, annual bluegrass, watergrass and foxtail were planted in individual rows one-half inch deep in Santa Cruz sandy loam soil contained in compressed paper flats 8¼″ x 6½″ which are 2¾″ deep. Enough seeds were planted to give about thirty to fifty plants each of the weed species in each flat. The flats were watered after planting. The following day each flat was sprayed at the rate of 20 pounds of the candidate compound under test in 80 gallons of solution per acre. An atomizer was used to spray the solution on the soil surface. Two weeks later the degree of weed control is determined by comparing the amount of germination and growth of each weed in the treated flats with weeds in several untreated control flats. The results of this test are reported in Table II.

TABLE II

| Compound No. | Crab grass | Annual bluegrass | Watergrass | Foxtail |
|---|---|---|---|---|
| 1 | +++ | | +++ | +++ |
| 2 | +++ | | +++ | +++ |
| 3 | +++ | | +++ | +++ |
| 4 | +++ | +++ | +++ | |
| 5 | +++ | +++ | +++ | |
| 6 | +++ | +++ | +++ | |
| 7 | +++ | +++ | ++ | |
| 8 | ++ | | + | |
| 9 | +++ | | +++ | |
| 10 | +++ | ++ | +++ | |
| 11 | +++ | | +++ | +++ |
| 12 | +++ | | +++ | +++ |
| 13 | +++ | | +++ | + |
| 14 | +++ | | +++ | +++ |
| 15 | +++ | | +++ | |
| 16 | +++ | | +++ | |
| 17 | +++ | | +++ | |
| 18 | +++ | | +++ | |
| 19 | +++ | +++ | +++ | |
| 20 | +++ | +++ | +++ | |
| 21 | +++ | | +++ | +++ |
| 22 | +++ | | + | |

+++ = Severe injury or death.
++ = Moderate injury.
+ = Slight injury.

It has also been found that compounds within the scope of the present invention have some effectiveness in the pre-emergence control of such additional weeds as red oats, pigweed, Indian mustard and curled dock. Post-emergence activity has also been found on the following species: crab grass, water-grass, red oats, Indian mustard, curled dock and pinto bean. Some of the compounds are quite selective in their action and can be used to eradicate or control grasses, while another type of plant is relatively unaffected.

The compounds of the present invention may be used as pre-emergence or post-emergence herbicides and may be applied in a variety of ways at various concentrations. They may be combined with suitable carriers and applied as dusts, sprays or drenches. The amount applied will depend on the nature of the weeds or plants to be controlled and the rate of application may vary from 1 to 50 pounds per acre. One particularly advantageous way of applying the compounds is as a narrow band along a row crop straddling the row.

We claim:
1. A substituted α-naphthoxyacetamide corresponding to the formula

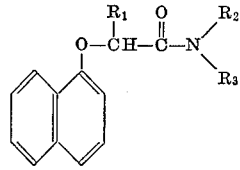

wherein $R_1$ is selected from the group consisting of hydrogen and lower alkyl, $R_2$ is selected from the group consisting of hydrogen, lower alkyl and lower alkenyl, and $R_3$ is selected from the group consisting of lower alkyl and lower alkenyl; provided that when $R_1$ and $R_2$ are both hydrogen $R_3$ is lower alkyl of from 1 to 2 carbon atoms, inclusive, or lower alkenyl.

2. The compound according to claim 1 in which $R_1$ is hydrogen, $R_2$ is methyl and $R_3$ is methyl.

3. The compound according to claim 1 in which $R_1$ is ethyl, $R_2$ is hydrogen and $R_3$ is isopropyl.

4. The compound according to claim 1 in which $R_1$ is methyl, $R_2$ is allyl and $R_3$ is allyl.

5. The compound according to claim 1 in which $R_1$ is hydrogen, $R_2$ is hydrogen and $R_3$ is methyl.

6. The compound according to claim 1 in which $R_1$ is ethyl, $R_2$ is hydrogen and $R_3$ is n-butyl.

7. A substituted α-naphthoxyacetamide corresponding to the formula

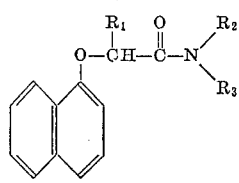

wherein $R_1$ is lower alkyl, $R_2$ is lower alkyl and $R_3$ is lower alkyl.

8. The compound according to claim 7 in which $R_1$ is methyl, $R_2$ is methyl and $R_3$ is methyl.

9. The compound according to claim 7 in which $R_1$ is methyl, $R_2$ is isopropyl and $R_3$ is isopropyl.

10. The compound according to claim 7 in which $R_1$ is methyl, $R_2$ is ethyl and $R_3$ is ethyl.

11. The compound according to claim 7 in which $R_1$ is ethyl, $R_2$ is n-propyl and $R_3$ is n-propyl.

References Cited

Fourneau et al.: Bul. Soc. Chim. France, vol. 37, pages 1602–5 relied on (1925).

Hamm et al.: Jour. Agric. Food Chem., vol. 4, pages 518–22 (1956).

La Brecque et al.: Jour. Econ. Entomol., vol. 53, pages 802–5 (1960).

Noller: Chemistry of Organic Compounds, 2nd ed., pages 244–5, Philadelphia, Saunders, 1957.

Thompson: Chem. Abst., vol. 41, columns 3902–11 (1947).

HENRY R. JILES, Primary Examiner

N. TROUSOF, Assistant Examiner

U.S. Cl. X.R.

71—118; 260—561